(12) United States Patent
Frederick, Jr. et al.

(10) Patent No.: US 6,178,497 B1
(45) Date of Patent: Jan. 23, 2001

(54) SYSTEM AND METHOD FOR DETERMINING THE RELATIVE AGE OF INSTRUCTIONS IN A PROCESSOR

(75) Inventors: Marlin Wayne Frederick, Jr., Cedar Park; Bruce Joseph Ronchetti, Austin, both of TX (US); Cang Tran, San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/134,342

(22) Filed: Aug. 14, 1998

(51) Int. Cl.[7] .................................................. G06F 9/30
(52) U.S. Cl. .................... 712/214; 712/221; 712/224; 709/106
(58) Field of Search .............................. 712/23, 42, 210, 712/214, 224, 238, 221; 709/106, 222

(56) References Cited

U.S. PATENT DOCUMENTS

| | | | |
|---|---|---|---|
| 5,774,712 | * 6/1998 | Cheong et al. | 712/245 |
| 5,805,849 | * 9/1998 | Jordan et al. | 712/214 |
| 5,897,666 | * 4/1999 | Mallick et al. | 711/217 |
| 5,931,957 | * 8/1999 | Konigsburg et al. | 714/48 |

* cited by examiner

*Primary Examiner*—Meng-Ai T. An
*Assistant Examiner*—Mackly Monestime
(74) *Attorney, Agent, or Firm*—Kelly K. Kordzik; Winstead Sechrest & Minick P.C.; Anthony V. S. England

(57) ABSTRACT

A system and method for determining an age function by performing a logical function on each entry residing within a queue, determining when a particular one of the entries residing in the queue was stored in the queue relative to the other entries, and determining an oldest or youngest entry residing in the queue relative to the logical functions performed on each of the instructions. In one embodiment of the present invention, the entries are instructions temporarily stored within a queue in the processor. The logical function performed may determine which of the instructions is valid. The queue may be cyclical.

13 Claims, 2 Drawing Sheets

SYSTEM AND METHOD FOR DETERMINING THE RELATIVE AGE OF INSTRUCTIONS IN A PROCESSOR

TECHNICAL FIELD

The present invention relates in general to data processing systems, and in particular, to determining an age function within a microprocessor.

BACKGROUND INFORMATION

In the class of microprocessors where instructions are issued and executed out of order, commonly a structure is needed to determine if any dependent instructions are executed out of order thereby generating an erroneous result. This structure typically requires the relative age (as determined by the program counter) of the instructions in determining if an error occurred. Since instruction streams are very long, it is impracticable to implement a structure large enough to hold an entire stream of instructions, so a structure of limited size is used, wherein once the end of the structure is reached, the entries are wrapped around to the beginning. Additionally, the structure typically holds a variety of information on each instruction.

Assume a cyclical queue and the position of an entry in the queue determines its relative age, with entries closer to the tail pointer being older than entries closer to the head. To determine the oldest valid entry in the queue, start at the tail of the queue and check the validity of that entry. If that entry is valid, then it is the oldest entry in the queue. If that entry is not valid, then check the next entry in the queue. If that entry is valid, then it is the oldest entry in the queue; or if that entry is not valid, move to the next entry in the queue. This process is repeated until a valid entry is found or the head pointer is reached.

Searching for a valid entry in this fashion is the definition of an age function. However, such a serial process is timely and inefficient. Therefore, there is a need for a more efficient means for determining the age function in a processor.

SUMMARY OF THE INVENTION

The present invention addresses the foregoing need by providing a system and method within a processor for determining an age function by performing a logical function on each entry residing within a queue, determining when a particular one of the entries residing in the queue was stored in the queue relative to the other entries, and determining an oldest or youngest entry residing in the queue relative to the logical functions performed on each of the instructions. In one embodiment of the present invention, the entries are instructions temporarily stored within a queue in the processor. The logical function performed may determine which of the instructions is valid. The queue may be cyclical.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
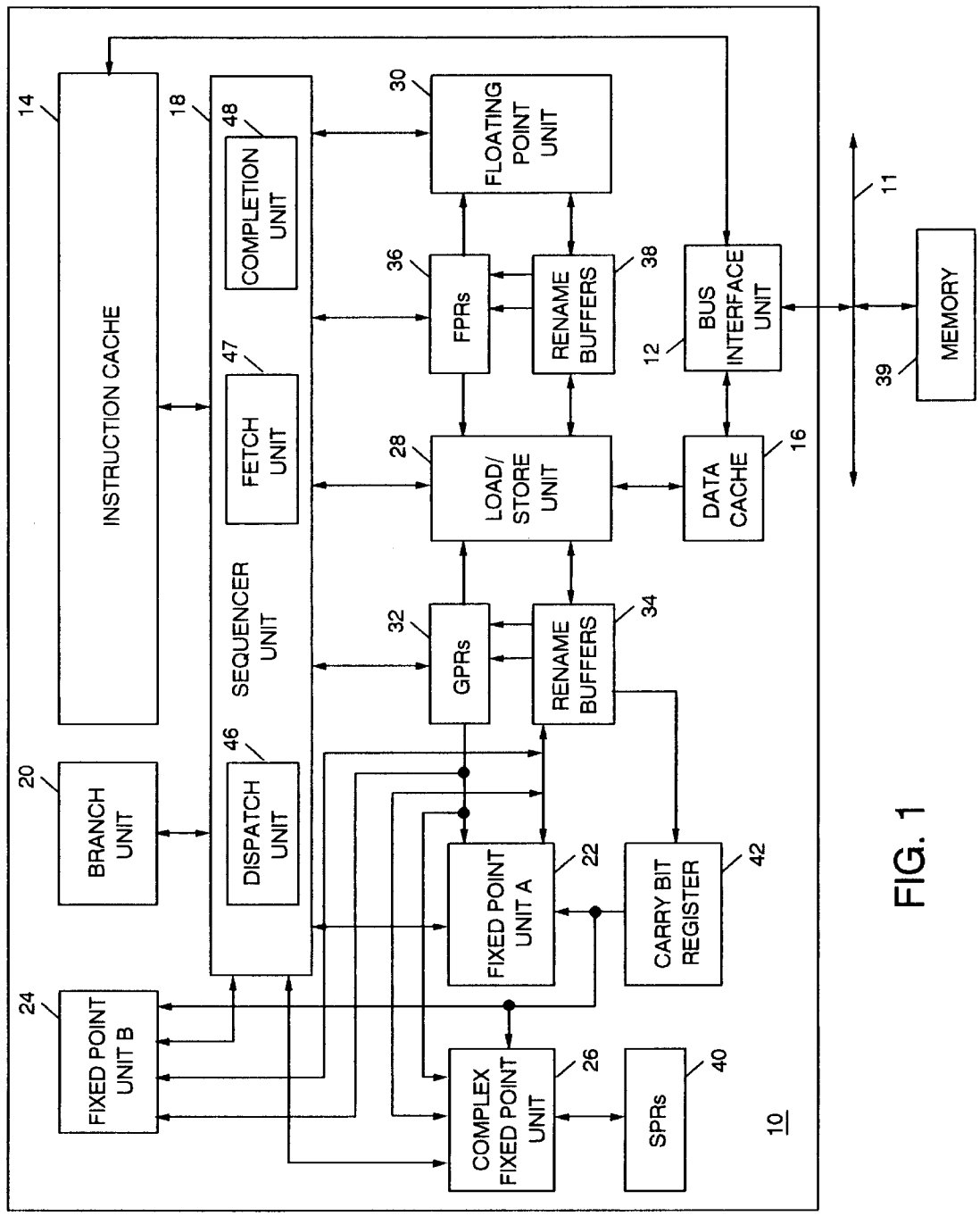
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

In the following disclosure, the term "valid" represents a vector whose components are generated by an arbitrary function performed in the queue. In one aspect, the valid vector represents "hits" as a result of the arbitrary function performed on each of the entries within the queue. The arbitrary logic function could literally include any logic function, and it is therefore not the intention to limit the scope of this disclosure to any particular logic function to be performed.

In the description of the implementation of the present invention, the terms "assert" and "negate" in various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state.

Refer now to the drawings wherein depicted elements are not necessarily shown to scale and wherein like or similar elements are designated by the same reference numeral through the several views.

FIG. 1 is a block diagram of a processor 10 system which may employ an embodiment of the present invention. Note that any other processor, ASIC, driver, etc. employing a queue may make use of the present invention. Processor 10 may be an out-of-order machine. Processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46, a fetch unit 47, and a completion unit 48, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g, one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information through a completion unit 48. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining". An instruction is normally processed as six stages, namely fetch, decode, dispatch, execute, completion, and writeback.

Since processor 10 is an out-of-order machine, it has a need to determine the relative ages of instructions being executed in various stages. The present invention provides a novel and efficient manner for doing so.

Figure 2:
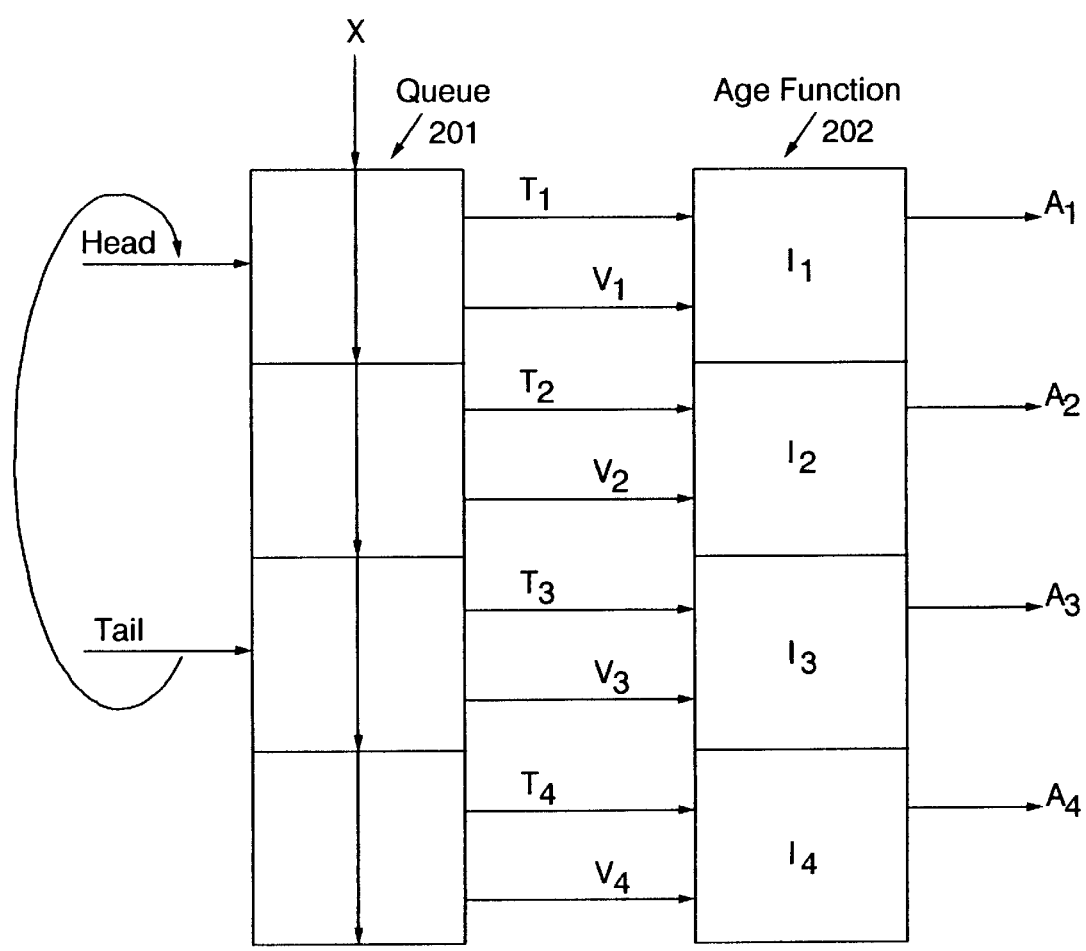
FIG. 2 illustrates an embodiment of the present invention.

Referring next to FIG. 2, there is illustrated one example of an implementation-of the present invention. Queue 201 may be any queue within processor 10. Queue 201 is shown as having four entries, but the invention is not limited to a four-entry queue.

In the following discussion, several assumptions are to be kept in mind. First, there may not be any valid entries in the queue 201 in which case no entry is to be selected. Second, the queue 201 is cyclical so the problem of determining when the tail and head pointers are in the wrap around case exists. While the structure and the scope of this invention are not limited to cyclical queues, for the remainder of this disclosure it will be assumed the structure is a cyclical queue. Third, any arbitrary function can be performed per queue entry rather than a simple check of validity, but for simplicity the rest of the disclosure will assume a valid function.

One approach to generating the age function can be implemented in an entry serial fashion that requires a number of cycles equal to the number of entries in the queue to determine the oldest entry. This is obviously very slow for all but the smallest queues. Another approach is to generate the age function in a ripple fashion where the tail entry is the starting point. If an entry is invalid, the next entry is checked for validity. If an entry is valid, the age signal is activated for the entry, and all younger entries have their age signal blocked by an inhibit signal that ripples through the entries in a fashion similar to the carry signal in a ripple carry adder. This process is repeated for every entry. To be more precise, since the tail pointer can be anywhere and the queue is cyclical, this approach is very similar in nature to an end-around ripple carry adder. While this approach permits the function to be performed in a single cycle it still is quite slow for large queues due to the O(n) (a reference to order analysis, which means the function's complexity is linear with the size of the queue) time it takes to perform the age function.

An object of the present invention is to speed up the inherently sequential (serial) nature of checking for a valid entry. First a vector needs to be generated that indicates where to start the search for a valid entry. This vector will be referred to as the tail vector. The tail pointer points to the oldest entry within the queue, while the head pointer points to the youngest entry in the queue. The search begins with the entry where the tail pointer is located and proceeds in a cyclical fashion towards the entry having the head pointer.

The tail vector will be inactive (logical zero) for the entry corresponding to the location of the tail pointer and active (logical one) for all other positions. This definition, while arbitrary, allows simplification of the rest of the age logic. In parallel with generation of the tail vector, the valid vector, $V_i$, is generated. This vector may be any arbitrary function to which the age function is to be applied. In this instance, a content addressable compare function is performed in each entry of queue 201 to determine if an entry is valid or not in response to the received input X. If the serial algorithm described above were implemented, the following equation would describe the generation of the Inhibit vector, $I_i$, within each entry of the age function block 202:

$$I_i = (I_{i-1} \cdot T_i) + \overline{(I_{i-1} \cdot T_i)} \cdot V_i \tag{1}$$

where $T_i$ is the aforementioned tail vector and $V_i$ is the valid function for entry i. Table 1 provides the truth table for the generation of Equation (1).

TABLE 1

| $T_i$ | $V_i$ | $I_{i-1}$ | $I_i$ |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

Notice the ith entry inhibit value, $I_i$, is a function of the previous entry inhibit value, $I_{i-1}$. Equation (1) can be simplified to:

$$I_i = (I_{i-1} \cdot T_i) + V_i \tag{2}$$

The proof for Equation (2) is:

$$I_i = (I_{i-1} \cdot T_i) + \overline{(I_{i-1} \cdot T_i)} V_i$$

$$= (I_{i-1} T_i + \overline{I_{i-1} T_i} V_i)$$

$$\cdot (1 + V_i)$$

$$= I_{i-1} T_i + \overline{I_{i-1} T_i} V_i$$

$$+ I_{i-1} T_i V_i + \overline{I_{i-1} T_i} V_i$$

$$= I_{i-1} T_i + \overline{I_{i-1} T_i} V_i$$

$$+ I_{i-1} T_i V_i$$

$$= I_{i-1} T_i + V_i (\overline{I_{i-1} T_i} + I_{i-1} T_i)$$

$$= I_{i-1} T_i + V_i (1) = I_{i-1} T_i + V_i$$

Now that the equation that defines the inhibit vector has been developed, the equation describing the age vector, $A_i$, becomes:

$$A_i = \overline{(I_{i-1} \cdot T_i)} \cdot V_i \tag{3}$$

Table 2 provides the truth tale for the generation of Equation (3).

TABLE 2

| $T_i$ | $V_i$ | $I_{i-1}$ | $A_i$ |
|---|---|---|---|
| 0 | 0 | 0 | 0 |
| 0 | 0 | 1 | 0 |
| 0 | 1 | 0 | 1 |
| 0 | 1 | 1 | 1 |
| 1 | 0 | 0 | 0 |
| 1 | 0 | 1 | 0 |
| 1 | 1 | 0 | 1 |
| 1 | 1 | 1 | 0 |

Notice, Equation (3) is a function of the previous entry's inhibit value, $I_{i-1}$, the present entry's tail value, $T_i$, and the present entry's valid value, $V_i$. The tail and valid values are inputs to the age function and are therefore stable well before the inhibit signal. Equation (3) is also implemented with logic circuitry within age function block 202.

The inhibit vector is defined precisely the same as the carry function of an adder. The following equation is the carry function of an adder:

$$C_i = (C_{i-1} \cdot P_i) + G_i \tag{4}$$

This makes the tail vector analogous to the propagate vector of an adder and the valid vector analogous to the generate vector of an adder. Equation (4) is referred to as a merge function. There has been an enormous amount of research focused on improving the speed by which the merge function can be computed. By virtue of the function being equivalent for adders and age functions, most of this work is applicable to implementing the age function.

Since the age function would likely be applied to a cyclic queue, it would be accurate to describe the inhibit generation logic as functionally equivalent to the carry generation logic of an end-around carry adder.

This observation that there is a way to cast the age function, so it uses the merge function for generating the inhibit vector provides a technique to implement age logic in O(log n) time and to borrow from the vast amounts of work done on adder designs.

Please note that the various assumptions and definitions described above have been set only for purposes of illustration. For example, the present invention is applicable to a non-cyclical queue. Furthermore, the tail pointer could be pointing to the youngest entry in the queue, while the head pointer could be pointing to the oldest entry in the queue. Yet still further, though each entry receives the X variable and performs a logical function to produce the valid vector, any other type of logical function could be performed in each entry in response to a received input in order to produce a desired output.

Although the present invention and its advantages have been described in detail, it should be understood that various changes, substitutions and alterations can be made herein without departing from the spirit and scope of the invention as defined by the appended claims.

What is claimed is:

1. A method for determining an age function in a processor, comprising the steps of:

performing a logical function on each instruction residing within a queue;

determining when a particular one of the instructions residing in the queue was stored in the queue relative to the other instructions; and determining an oldest or youngest instruction residing in the queue relative to the logical functions performed on each of the instructions, wherein the step of determining the oldest or youngest instruction residing in the queue relative to the logical functions performed on each of the instructions further comprises the step of calculating:

$$A_1=\overline{(I_{i-1} \cdot T_i)} \cdot V_1$$

wherein i is the index of the instruction residing in the queue, and wherein $V_i$ is a vector representing which of the i instructions are valid, and wherein $T_i$ is a vector representing which of the i instructions is the oldest or the youngest, and wherein $I_{i-1}$ is derived from:

$$I_i=(I_{i-1} \cdot T_i)+V_1.$$

2. The method as recited in claim 1, wherein the performing step determines which of the instructions are valid.

3. The method as recited in claim 1, wherein the queue is cyclical.

4. The method as recited in claim 1, wherein the step of determining the oldest or youngest instruction residing in the queue relative to the logical functions performed on each of the instructions is performed relative to each of the instructions substantially in parallel.

5. Circuitry for determining an age function in a processor, comprising:

logic circuitry in a queue for performing a logical function on each entry residing within the queue;

a pointer for determining when a particular one of the entries residing in the queue was stored in the queue relative to the other entries; and circuitry for determining an oldest or youngest entry residing in the queue in response to receipt of (1) signals from the logic circuitry, and (2) the pointer, wherein the circuitry for determining the oldest or youngest entry residing in the queue relative to the logical functions performed on each of the entries further comprises the step of calculating:

wherein there are i number of entries residing in the queue, and wherein $V_i$ is a vector $$A_1=\overline{(I_{i-1} \cdot T_i)} \cdot V_1$$

representing which of the i entries are valid, and wherein $T_i$ is a vector representing which of the entries is the oldest or the youngest, and wherein $I_{i-1}$ is derived from:

$$I_i=(I_{i-1} \cdot T_i)+V_1.$$

6. The circuitry as recited in claim 5, wherein the queue is cyclical.

7. The circuitry as recited in claim 5, wherein the step of determining the oldest or youngest entry residing in the queue relative to the logical functions performed on each of the entries is performed relative to each of the entries substantially in parallel.

8. The circuitry as recited in claim 5, wherein the entries are instructions.

9. A processor comprising:

circuitry operable for retrieving instructions from an external storage;

circuitry for dispatching the instructions to a plurality of execution units;

a queue operable for storing the instructions in a cyclical manner;

a first pointer for indicating which of the instructions is the oldest instruction in the queue;

a valid bit vector $V_i$ indicating which of the instructions stored in the queue are valid;

circuitry for producing a tail vector $T_i$ which is a function of the first pointer;

circuitry for calculating an inhibit vector $I_i$:

$$I_i=(I_{i-1} \cdot T_i)+V_i$$

circuitry for calculating an age vector $A_i$:

$$A_i=\overline{(I_{i-1} \cdot T_i)} \cdot V_i.$$

10. A method for asserting an age signal for an instruction stored in a queue, indicating whether the instruction is an oldest stored instruction satisfying a certain logic function, comprising the steps of:

asserting pointer signals for all of the instructions stored in the queue, except one which is the most recently stored one of the instructions;

asserting respective logic signals for those of the instructions which satisfy the certain logic functions;

asserting inhibit signals for the instructions in response to the pointer signals and logic signals for the respective instructions, wherein an inhibit signal for such a respective instruction is asserted further in response to an inhibit signal for a next most recently stored one of the instructions; and asserting age signals for the instructions responsive to the pointer signals, logic and inhibit signals for the respective instructions.

11. The method as recited in claim 10, wherein the certain logic function is an instruction validity function.

12. A system for asserting an age signal for an instruction stored in a queue, indicating whether the instruction is an oldest stored instruction satisfying a certain logic function, comprising:

circuitry for asserting pointer signals for all of the instructions stored in the queue, except one which is the most recently stored one of the instructions;

circuitry for asserting respective logic signals for those of the instructions which satisfy the certain logic functions;

circuitry for asserting inhibit signals for the instructions in response to the pointer signals and logic signals for the respective instructions, wherein an inhibit signal for such a respective instruction is asserted further in response to an inhibit signal for a next most recently stored one of the instructions; and circuitry for asserting age signals for the instructions responsive to the pointer signals, logic and inhibit signals for the respective instructions.

13. The system as recited in claim 12, wherein the certain logic function is an instruction validity function.

* * * * *